Oct. 1, 1968 D. D. WENDT ET AL 3,403,841
BAGS
Filed March 19, 1965 5 Sheets-Sheet 1

Donovan D. Wendt,
Milton J. Heimos,
Inventors.
Koenig, Senniger, Powers and Leavitt,
Attorneys.

Oct. 1, 1968
D. D. WENDT ET AL
3,403,841
BAGS
Filed March 19, 1965
5 Sheets-Sheet 2
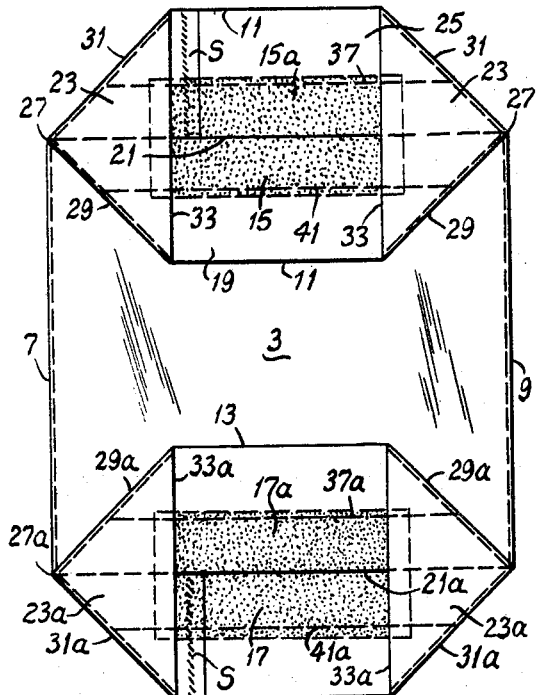
FIG. 4.
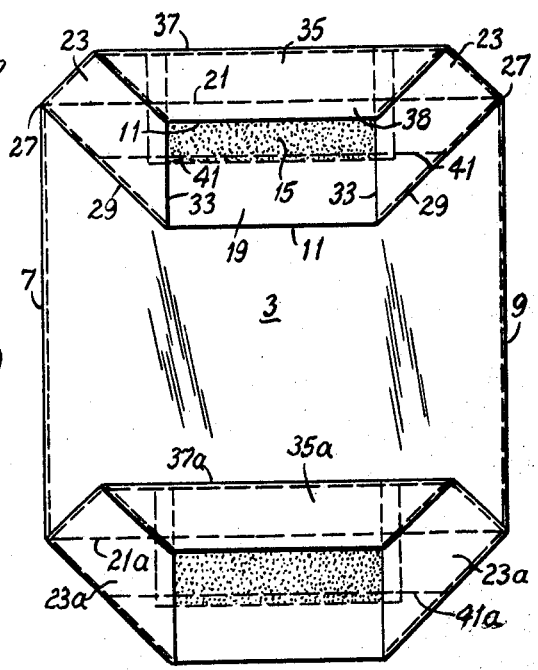
FIG. 5.
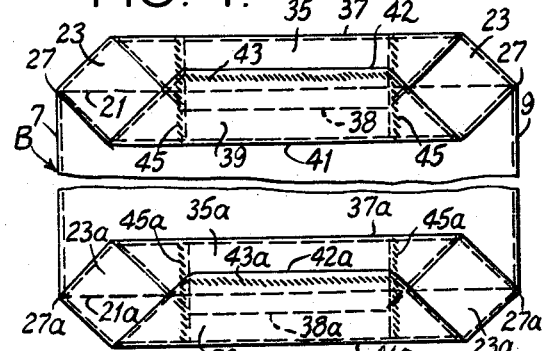
FIG. 6.
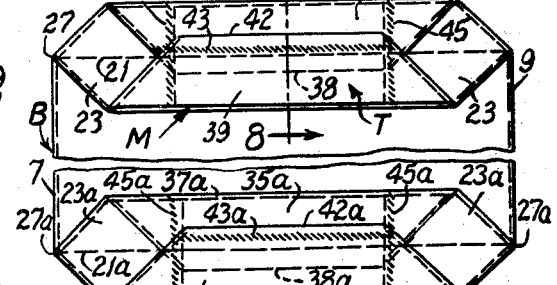
FIG. 7.
FIG. 8.
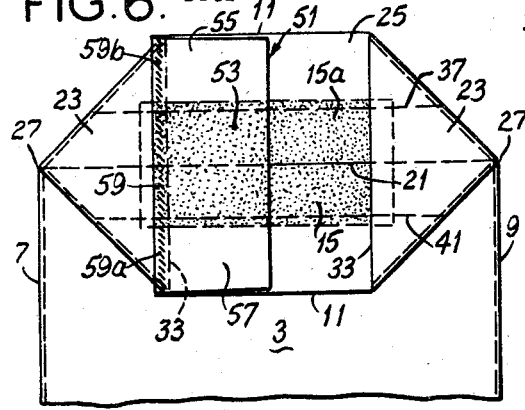
FIG. 9.
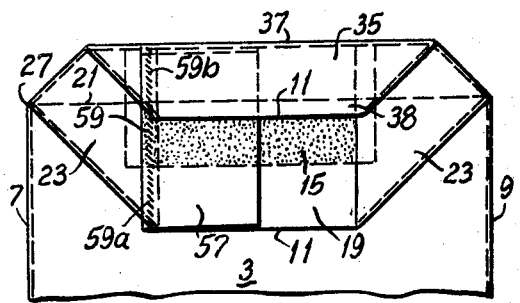
FIG. 10.

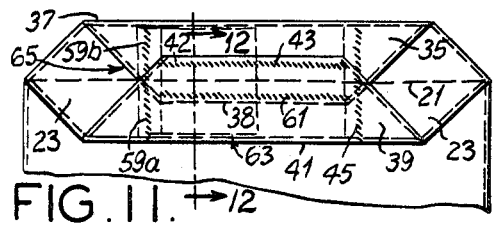
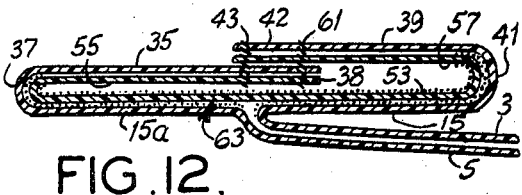
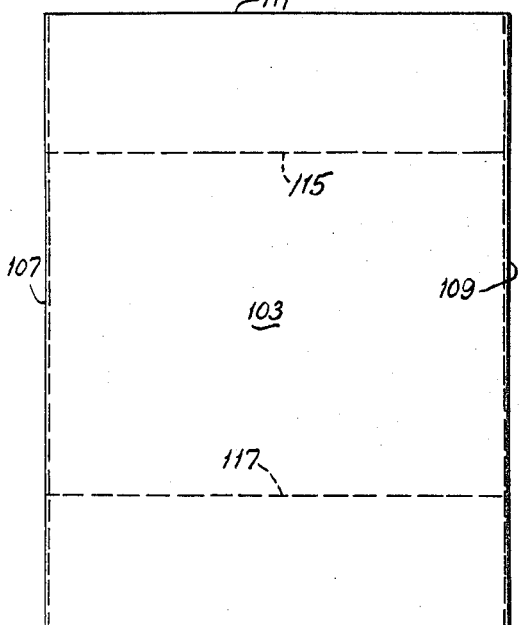
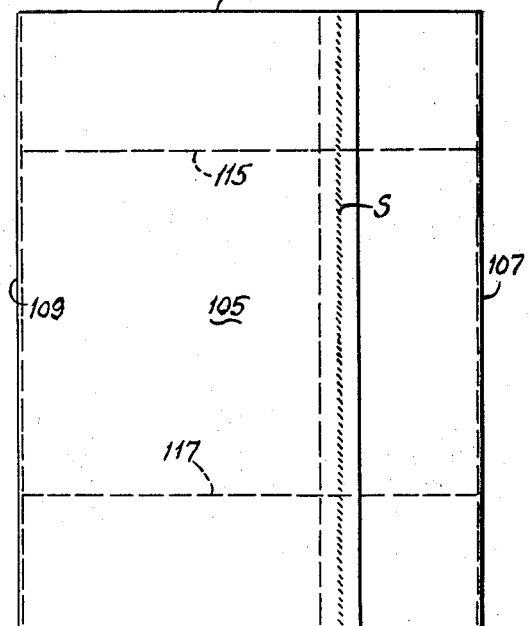
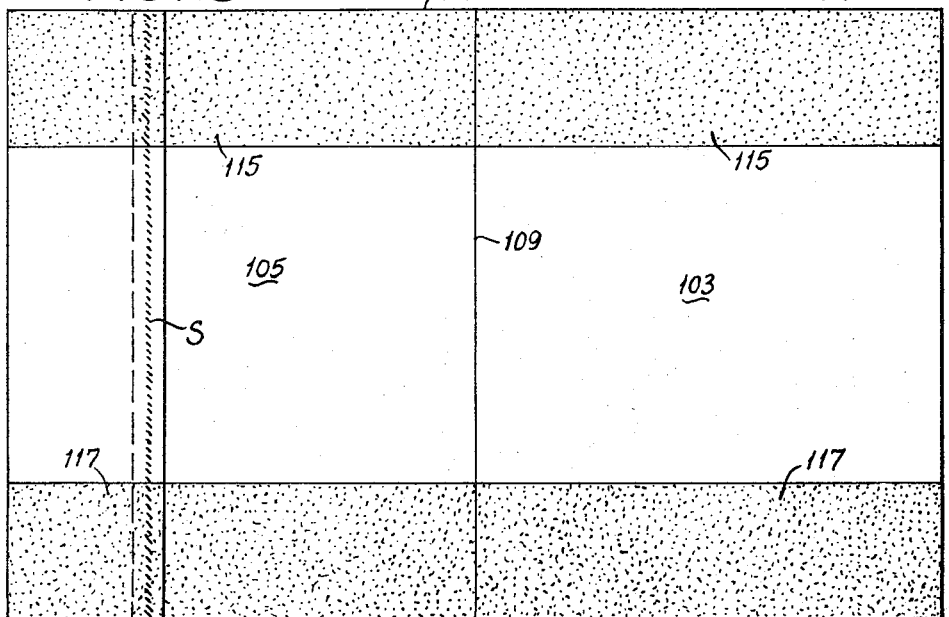

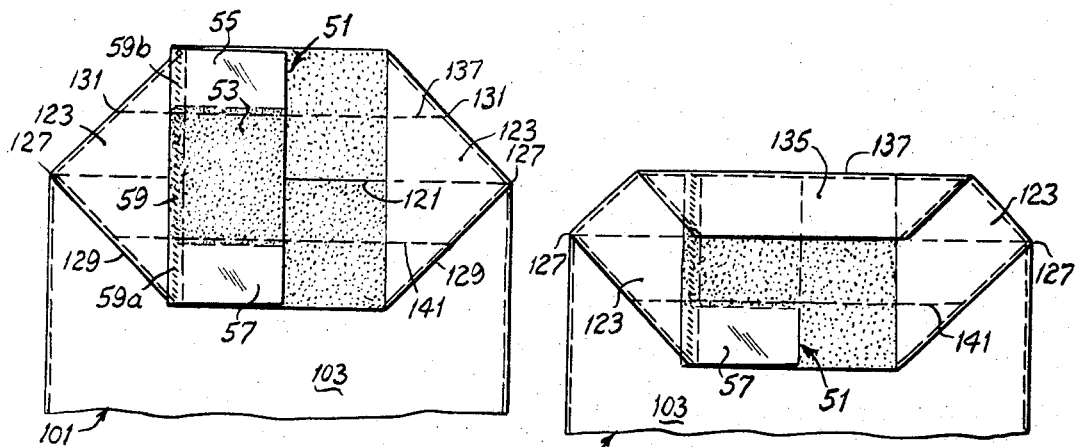
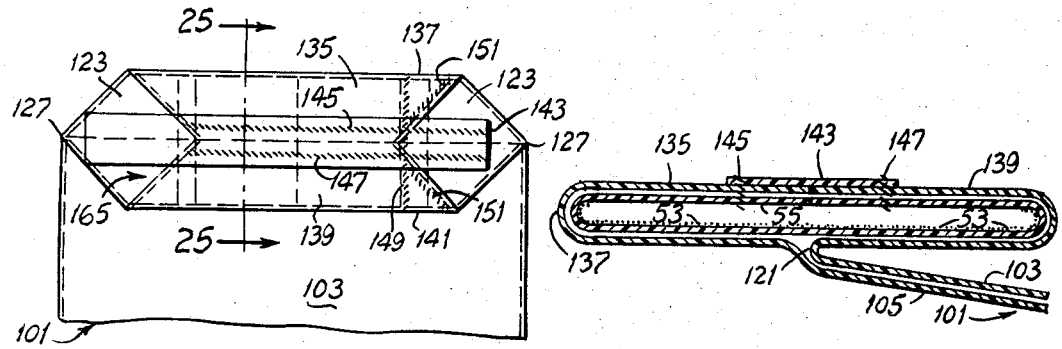

United States Patent Office 3,403,841
Patented Oct. 1, 1968

3,403,841
BAGS
Donovan D. Wendt, St. Paul, and Milton J. Heimos, Minneapolis, Minn., assignors to Bemis Bro. Bag Company, Minneapolis, Minn., a corporation of Missouri
Filed Mar. 19, 1965, Ser. No. 441,212
18 Claims. (Cl. 229—60)

ABSTRACT OF THE DISCLOSURE

A plastic bag having a diamond-fold closure comprising inwardly directed end flaps and side flaps, the side flaps being folded over on the end flaps and being heat-sealed together from one end flap to the other and heat-sealed at least to one end flap, heat-seal-inhibiting material being provided on the inside of the tube from which the bag is formed in a pattern such as to inhibit blocking of the closure where it is heat-sealed.

---

Among the several objects of this invention may be noted the provision of plastic bags, and more particularly heavy-duty polyethylene bags for powdered or granular or like material, having end closures adapted when filled to square off, i.e., to assume a rectangular form; the provision of bags such as described wherein the end closures are heat-sealed without any blocking thereof due to the heat-sealing, the provision of a bag with such end closures at both top and bottom, each adapted to square off when the bag is filled; the provision of a bag such as described which has an open mouth at the top adapted, after the bag has been filled, to be closed by heat-sealing without any blocking of the top due to the heat-sealing; and the provision of a bag such as described which has a valve for filling purposes. Other objects and features will be in part apparent and in part pointed out hereinafter.

The invention accordingly comprises the constructions and methods hereinafter described, the scope of the invention being indicated in the following claims.

In the accompanying drawings, in which several of various possible embodiments of the invention are illustrated, FIG. 1 is a view in elevation of one face of a bag tube from which a bag of this invention is made;

FIG. 4 is a view similar to FIG. 1 showing certain steps in the formation of top and bottom closures for the tube;

FIG. 5 is a view similar to FIG. 4 showing further steps in the formation of the closures;

FIG. 6 is a view similar to FIG. 5 showing a further stage in the operations on the tube;

FIG. 7 is a view similar to FIG. 6 showing a completed open-mouth bag;

FIG. 8 is an enlarged section on line 8—8 of FIG. 7;

FIG. 9 is a view similar to FIG. 4 showing a step in the forming of a valve bag instead of an open-mouth bag from the FIG. 1 tube;

FIG. 10 is a view similar to FIG. 9 showing a further stage in the operation of forming a valve bag;

FIG. 11 is a view similar to FIG. 10 showing the completed top closure of the valve bag;

FIG. 12 is an enlarged section on line 12—12 of FIG. 11;

FIGS. 13, 14 and 15 are views similar to FIGS. 1, 2 and 3 showing a modified tube for producing a modified version of the bag;

FIG. 22 is a view similar to FIG. 16 showing a step in the forming of a valve bag instead of an open-mouth bag from the FIG. 13 tube;

FIG. 23 is a view similar to FIG. 22 showing a further stage in the operation of forming a valve bag;

FIG. 24 is a view similar to FIG. 23 showing the completed top closure of the valve bag; and FIG. 25 is an enlarged section on line 25—25 of FIG. 24.

Corresponding reference characters indicate corresponding parts throughout the several views of the drawings.

Figure 1:
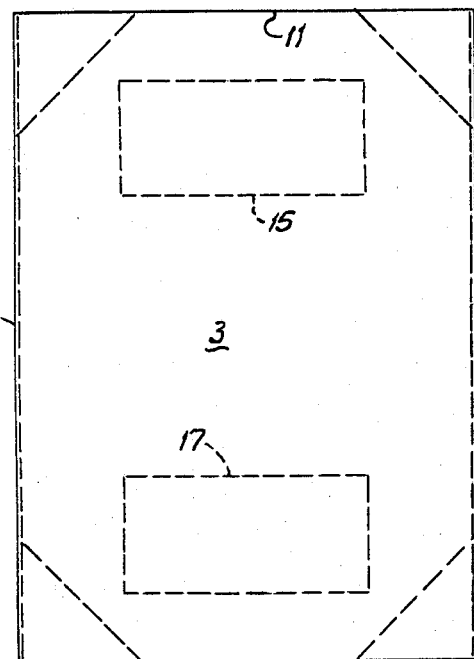
Figure 2:
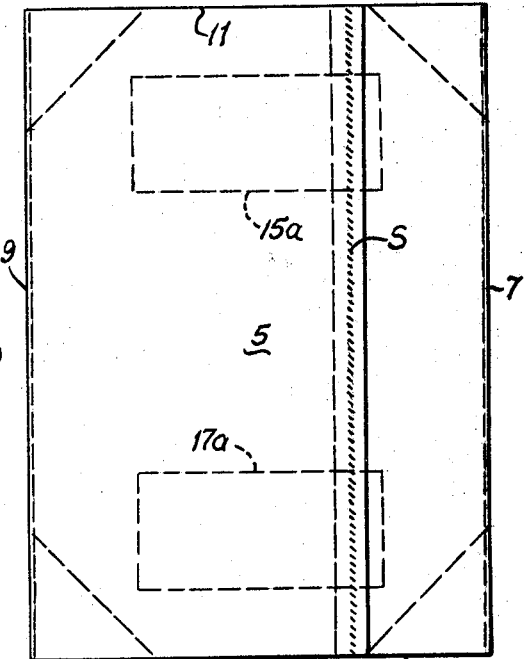
FIG. 2 is a view in elevation of the other face of the FIG. 1 tube.

Referring to the drawings, FIGS. 1 and 2 show a flat bag tube 1 from which a bag of this invention is made, this tube being made of flexible heat-sealable sheet plastic material such as polyethylene. The opposed walls of the tube are designated 3 and 5. Wall 3 may be referred to as the front wall and wall 5 as the back wall. The side folds of the tube, which constitute its side edges, are designated 7 and 9. The tube has straight-cut ends 11 and 13, 11 being the upper end and 13 being the bottom end as shown.

Adjacent the upper end of the tube, the front wall 3 has on its inside surface a pattern of heat-seal-inhibiting material such as indicated at 15. As shown, this pattern may consist simply of a rectangular area of the heat-seal-inhibiting material. It is located generally centrally of the width of the wall 3 and spaced downward from the upper end 11 of wall 3. The back wall 5 has a similar rectangular area 15a of heat-seal-inhibiting material on its inside surface which registers with the area 15 on the inside surface of the front wall.

Adjacent the bottom end of the tube, the front wall 3 has on its inside surface a pattern of heat-seal-inhibiting material such as indicated at 17. As shown, this is a rectangular area of the heat-seal-inhibiting material the same as area 15, located generally centrally of the width of wall 3 and spaced upward from the bottom end 13 of wall 3. The back wall 5 has a similar rectangular area 17a of heat-seal-inhibiting material on its inside surface which registers with pattern or area 17 on the inside surface of the front wall.

The heat-seal-inhibiting material used at 15, 15a, 17 and 17a may be, for example, a commercially available polyamide-base ink printed on the plastic material from which the tube 1 is formed by suitable means. It will be understood that bag tubes such as the tube 1 shown in FIGS. 1 and 2 may be manufactured in commercial production by segmenting a continuous length of plastic tubing (e.g., polyethylene tubing) into individual flat bag tubes, the tubing being made from flat web stock which is printed on one face with the heat-seal-inhibiting material at 15, 15a, 17, 17a at appropriate intervals along its length prior to being formed into the continuous tubing (the printed face of the web coming on the inside of the tubing). In such case, the tubing and the tubes 1 into which the tubing is segmented have a longitudinal seam indicated at S in the back wall 5 (a so-called back seam).

The tube 1 is provided with a diamond-fold top closure formation as shown in FIGS. 4-6 by opening up the upper end of the tube and folding back an upper end portion 19 of the front wall 3 on a fold line 21 extending transversely across the tube about midway of the heat-seal-inhibiting area 15. This operation results in the formation of end flaps 23 for the diamond-fold top closure and an upward extension 25 of the back wall 5. Each of the end flaps 23 is of triangular form, having an apex 27 at the respective end of the fold line 21, the sides of the triangle being constituted by folds 29 and 31 on 45° lines extending from the apex. In the condition of the tube 1 as shown in FIG. 4 with the upper end opened up to form the inwardly directed end flaps 23 of the diamond-fold top closure, the upper end portion 19 of the front wall 3 of the tube is laid back on the outside of the front wall 3, exposing portions of heat-seal-inhibiting areas 15 and 15a between the end flaps on opposite sides of the fold line 21. These areas are of such length crosswise of the tube as to extend laterally outward past the inner end edges 33 of the end flaps 23.

Following the above operation of folding back portion 19 of the front wall 3, an upper segment 35 of back wall extension 25 is folded over on a transverse fold line 37 extending parallel to line 21 to overlie the end flaps 23 (FIG. 5). Line 37 is spaced from line 21 somewhat less than half the distance from line 21 to edge 11 of extension 25. The folded-over segment 35 forms a first side flap of the top closure formation, and has a margin 38 which laps over the fold line 21. Then, a lower segment 39 of portion 19 of the front wall is folded over on a transverse fold line 41 extending parallel to line 21 and spaced from line 21 a distance equal to the spacing of line 37 from line 21 (FIG. 6). The folded-over segment 39 forms a second side flap of the top closure formation and has a margin 42 which overlaps margin 38 of flap 35. The lapping margins 38 and 42 of the side flaps 35 and 39 are heat-sealed together along a line 43 extending from one end flap 23 to the other. The side flaps 35 and 39 are also heat-sealed at their ends to the end flaps 23 on lines such as indicated at 45.

The seals along the lines 43 and 45 may be made simply by applying heat and pressure to the tube 1 in its FIG. 6 state along these lines without any blocking of the top closure formation due to the fact that these seals are all made within the confines of the heat-seal-inhibiting material in areas 15 and 15a. Thus, when heat and pressure is applied along line 43, the margins 38 and 42 of the side flaps 35 and 39 become heat-sealed together along this line, but margin 38 of side flap 35 is prevented from becoming sealed to wall 5 by the heat-seal-inhibiting material in area 15a. When heat and pressure is applied along lines 45, the side flaps 35 and 39 become heat-sealed to the end flaps 23 along these lines, but the end flaps 23 are prevented from becoming sealed to wall 5 and portion 19 of the front wall 3 by the heat-seal-inhibiting material in areas 15 and 15a.

The tube 1 is provided with a diamond-fold bottom closure formation as shown in FIGS. 4-7 in the same manner as above described for the top closure formation. The resultant bottom closure is identical to the top closure formation shown in FIG. 6, and parts thereof corresponding to those of the top closure formation are designated by the same reference numerals as used for the parts of the top closure formation with the letter a added.

The bag formed as above described is completely closed, and, as illustrated in FIGS. 7 and 8, its top closure formation (designated T) is provided with an open mouth M by slitting is along either one of the folds 37 or 41, or cutting away one of these folds (the fold 41 as shown). This completes the formation of the bag, designated B in FIG. 7, which may be readily filled through the mouth M. When filled, the top and bottom closure formations square out to generally rectangular form. After the bag has been filled, the mouth M may be closed by folding a length of heat-sealable tape C, such as polyethylene tape, around the mouth as illustrated in dotted lines in FIG. 8, and heat-sealing the tape in place along lines of seal on opposite sides of the mouth slit M. Sealing of the tape may be effected without sealing together of the margins of the bag material at the mouth due to the fact that a portion of the heat-seal inhibiting material in area 15 is interposed between margins of the bag material at the mouth.

FIGS. 9-12 illustrate a modification of the above involving formation of a valve bag instead of an open-mouth bag, FIGS. 11 and 12 illustrating the completed diamond-fold closure at the valve end of the bag. FIG. 9 shows the same bag tube 1 as shown in FIGS. 1-7, opened up at the upper end in the same manner as shown in FIG. 4, with a valve sleeve 51 heat-sealed to one of the end flaps 23 (the left-hand end flap, as shown). The valve sleeve comprises a rectangular blank of flexible heat-sealable sheet plastic material, such as polyethylene, having a vertical dimension corresponding generally to the length of end edge 33 of an end flap 23, and a horizontal dimension which may be somewhat greater than half the distance between opposed edges 33 of the end flaps. The blank is provided on one face (its upper face as viewed in FIG. 9) with heat-seal-inhibiting material in a broad horizontal central band portion 53 having a width somewhat greater than the distance between fold lines 37 and 41. Side portions 55 and 57 of the blank on opposite sides of the central portion 53 are free of heat-seal-inhibiting material.

The blank 51 is applied to the opened-up upper end of the tube 1 with its long left-hand margin overlapping the inner end margin of the left-hand end flap 23, the blank extending inward from this end flap toward but terminating short of the right-hand end flap 23, with the face of the blank on which the heat-seal-inhibiting material is provided at 53 on the outside. The margin of the sleeve blank which overlaps the inner end margin of the left-hand end flap is then heat-sealed to the latter along a line 59. This operation is effected without sealing of the left-hand end flap to the portions 19 and 25 where inhibited by the heat-seal-inhibiting material in areas 15, 15a. However, the left-hand end flap 23 becomes sealed to portions 19 and 25 along portions 59a and 59b of line 59 which lie outward of the heat-seal-inhibiting material in areas 15, 15a, as is desirable.

As shown in FIG. 10, flap 35 and the respective portion 55 of the sleeve blank is folded over on transverse fold line 37 to overlie the end flaps 23. Then, as shown in FIGS. 11 and 12, flap 39 and the respective portion 57 of the sleeve blank 51 is folded over on fold line 41 so that margin 42 of flap 39 laps over margin 38 of flap 35. The lapping margins of the flaps are heat-sealed together along line 43, and may also be heat-sealed together along a line 61 parallel to and adjacent line 43 for double securement. These seals on lines 43 and 61 secure together folded-over portion 55 of the sleeve blank, flap 35, folded-over portion 57 of the sleeve blank and flap 39 along the lines 43 and 61 so that the sleeve blank is thereby formed into a flat tubular sleeve as indicated at 63 in FIG. 12. A heat-seal is made on a line 45 only at the right to secure the folded-over flaps 35 and 39 to the right-hand end flap 23. The flaps 35 and 39 are not sealed at the left to the left-hand end flap 23, so as to leave a valve opening at 65 for entry of a filling spout into the sleeve for filling the bag. The seals may be made at 43, 61 and at 45 without any blocking by reason of the heat-seal-inhibiting material at 15 and 15a on the inside of the walls of the tube and at 53 on the sleeve. In this respect, it will be observed that when the seal is made at 59, the material at 15, 15a inhibits sealing of the left-hand end flap 23 to walls 3 and 5 along the portion of this seal 59 between fold lines 37 and 41 (which define the sides of the rectangular top closure formation). When the seals are made at 43 and 61, the material at 53 inhibits sealing of folded-over portion 55 of the sleeve to the underlying portion of the sleeve, and the material at 15, 15a to the right of the sleeve inhibits sealing of flap 35 to the walls 3 and 5. The bottom of the bag shown in FIGS. 9–12 is made the same as in FIGS. 4–7.

Figure 3:
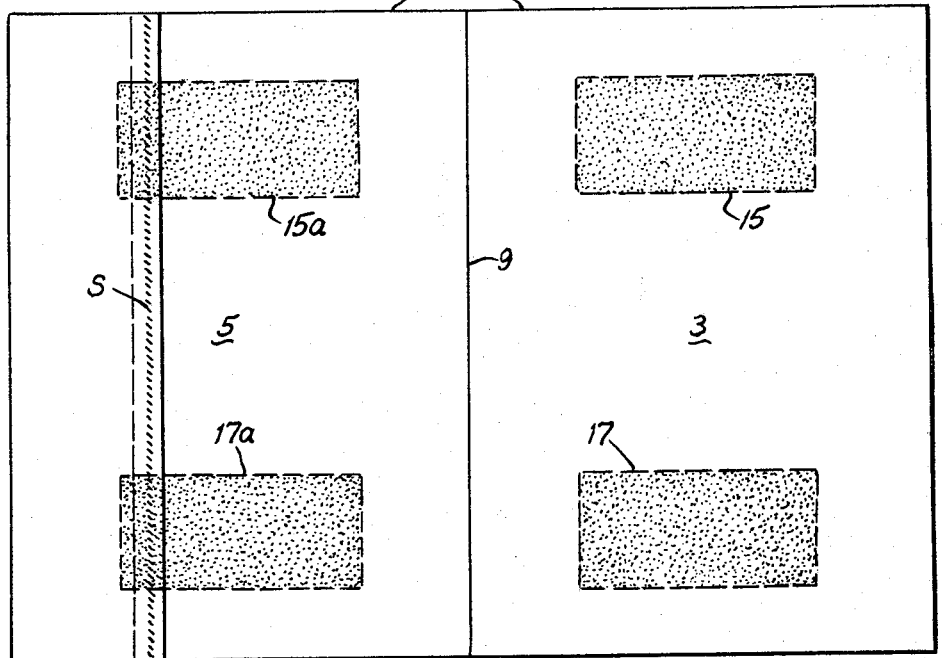
FIG. 3 is a view of the tube as if it were opened up like a book to show the inside faces of the walls of the FIG. 1 tube.

FIGS. 13–15 show a flat bag tube 101 having somewhat different patterns of heat-seal-inhibiting material than the tube 1 shown in FIGS. 1–3 for producing a modified version of the open-mouth bag of this invention. The front and back walls of tube 101 are designated 103 and 105, its side edges are designated 107 and 109, and its straight-cut top and bottom ends are designated 111 and 113. At the upper end of the tube 101, and on the inside face of the tube, there is a band 115 of heat-seal-inhibiting material extending completely girthwise around the tube. At the bottom end of the tube 101, and on its inside face, there is a similar band 117 of heat-seal-inhibiting material extending completely girthwise around the tube.

Figure 16:
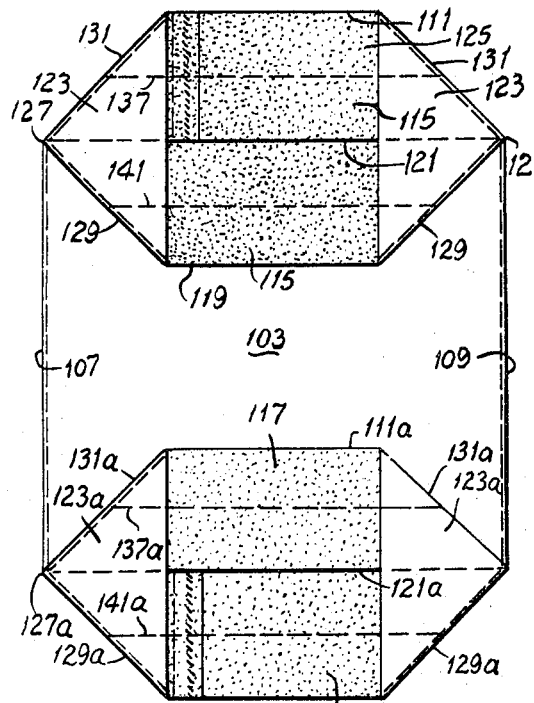
FIG. 16 is a view similar to FIG. 13 showing certain steps in the formation of top and bottom closures for the FIG. 13 tube.

The tube 101 is provided with a diamond-fold top closure as shown in FIGS. 16–21 by opening up the upper end of the tube and folding back an upper end portion 119 of the front wall 103 on a fold line 121 extending transversely across the tube just above the lower edge of the band 115. This operation results in formation of triangular end flaps 123 for the diamond-fold closure and an extension 125 of the back wall 105. The apex of each triangular end flap is designated 127 and its sides (which are constituted by folds on 45° lines extending from the apex) are designated 129 and 131. In the condition of the tube 101 as shown in FIG. 16 with its upper end opened up to form the inwardly directed end flaps, the upper end portion 119 of the front wall 103 is laid back on the outside of the front wall, exposing portions of band 115 on opposite sides of the fold line.

Figure 17:
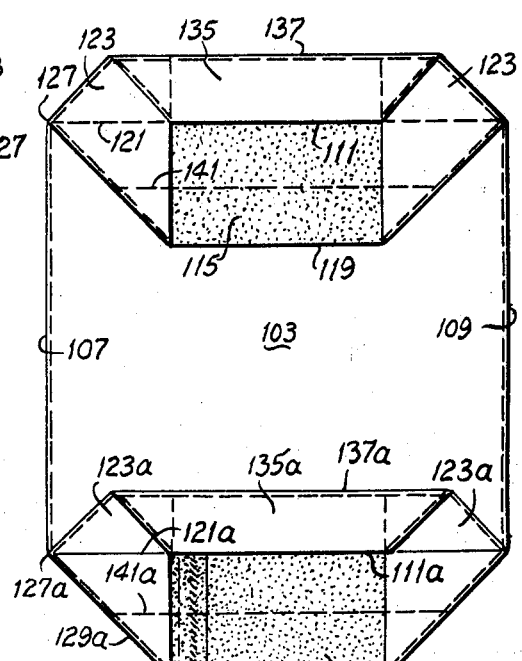
FIG. 17 is a view similar to FIG. 16 showing further steps in the formation of the closures.
Figure 18:
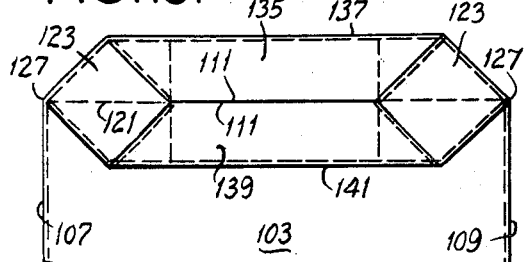
FIG. 18 is a view similar to FIG. 17 showing a further stage in the operations on the FIG. 13 tube.
Figure 19:
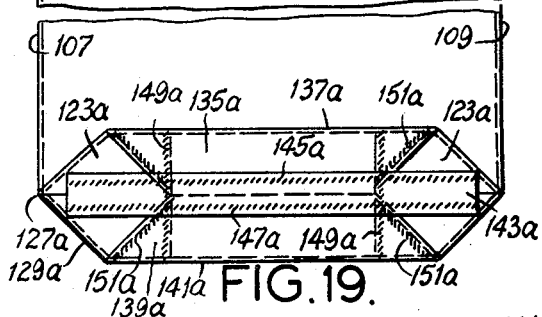
FIG. 19 is a view similar to FIG. 18 showing still a further stage in the operations on the FIG. 13 tube.

Following the above, a segment 135 of back extension 125 is folded over on a transverse fold line 137 extending parallel to line 121 and lying approximately half way between line 121 and the end edge 111 of the extension 125 to overlie the end flaps 123 (FIG. 17). This segment 135 forms a side flap of the diamond-fold closure constituting one-half the closure (its edge 111 registering generally with fold line 121). Then, a segment 139 of portion 119 is folded over on a transverse fold line 141 parallel to line 121 lying approximately half way between line 121 and the end edge 111 of portion 119 to overlie the end flaps (FIG. 18). This segment 139 forms a second side flap of the diamond-fold closure constituting its other half (its edge 111 also registering generally with fold line 121 and being contiguous to edge 111 of flap 135). Then a strip 143 of flexible heat-sealable sheet material (e.g., polyethylene) is applied to overlie the adjacent margins of flaps 135 and 139, this strip extending outward beyond the end edges of flaps 135 and 139 over the end flaps 123, and heat seals are made along the length of the strip on lines 145 and 147 on opposite sides of line 121 to heat-seal the strip to both of the side flaps 135 and 139 and to the end flaps 123 (FIG. 19). The side flaps 135 and 139 are heat-healed at their ends to the end flaps 123 on lines as indicated at 149 (which correspond to seals 45). Additional end seals may be made at 151. It will be observed that the seals may be made at 145, 147, 149 and 151 without any blocking of the top closure by reason of the heat-seal-inhibiting material at 115.

The tube 101 is provided with a diamond-fold bottom closure formation as shown in FIGS. 16–19 in the same manner as above described for its top closure formation. The resultant bottom closure formation is identical to the top closure formation shown in FIG. 19, and parts thereof corresponding to those of the top closure formation are designated by the same reference numerals as used for the parts of the top closure formation with the letter a added.

Figure 20:
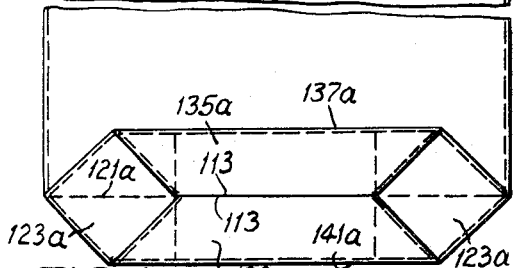
FIG. 20 is a view showing the completed top closure made from the FIG. 19 construction having an open mouth.
Figure 21:
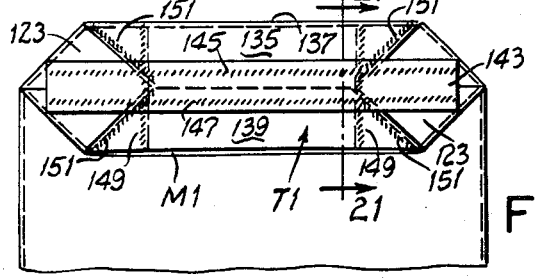
FIG. 21 is an enlarged section on line 21—21 of FIG. 20.

The bag at the stage of operations shown in FIG. 19 is completely closed, and, as illustrated, in FIGS. 20 and 21, the top closure (designated in its entirety by the reference character T1) is provided with an open mouth M1 corresponding to the mouth M of the FIG. 7 bag. After the bag has been filled, the mouth M1 may be closed by a tape as described in the conjunction with FIG. 8.

FIGS. 22–25 illustrate a modification of the FIGS. 13–21 operations and bag involving formation of a valve bag instead of an open mouth bag, FIGS. 24 and 25 illustrating the completed diamond-fold closure at the valve end of the bag. FIG. 22 shows the same bag tube 101 as shown in FIGS. 13–21, opened up at the upper end in the same manner as shown in FIG. 16, with a valve sleeve blank 51 the same as shown in FIG. 9 heat-sealed to one of the end flaps 123 (the left-hand end flap as shown), and applied in the same manner. The margin of the sleeve blank which overlaps the inner end margin of the left-hand end flap 123 is heat-sealed to the latter along line 59 the same as in FIG. 9. The top closure is formed in the same manner as shown in FIGS. 17–20, except that heat seals 149 and 151 are made only at the right and seals 145 and 147 are not carried across the left-hand end flap so as to leave a valve opening at 165 for entry of a filling spout.

Each of the forms of bag shown herein is of such construction that, for a bag of given capacity, substantially less plastic material is needed than for a flat-tube bag with conventional end seals that assumes a pillow-form when filled. Thus, for example, a bag of this invention made from a tube initially about seventeen inches wide (in the flat) and about twenty-five inches long contains as much as a flat-tube bag with conventional end seals some two inches longer.

It will be understood that the pattern of heat-seal-inhibiting material at the ends of the tube may be widely varied from the patterns specifically shown herein, the principal criteria being that they inhibit blocking of the top and bottom closures.

While the bags shown in the drawings and described above have closures of this invention at both top and bottom, it will be understood that bags may be made with an end closure of this invention at one end only, and closed at the other end in other suitable manner.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A bag formed from a flat tube of heat-sealable sheet material, said tube having heat-seal-inhibiting material on the inside surface thereof at one end, said tube having a closure formation at said one end comprising inwardly directed end flaps and first and second side flaps, the side flaps of said closure formation being generally of equal width and heat-sealed together from one end flap to the other and heat-sealed at least to one end flap of said closure formation, the heat-seal-inhibiting material being provided in a pattern such as to inhibit blocking of said closure formation where it is heat-sealed.

2. A bag as set forth in claim 1 wherein the side flaps of said closure formation have lapping inner margins and are heat-sealed together along said margins.

3. A bag formed from a flat tube of heat-sealable sheet material, said tube having heat-seal-inhibiting material on the inside surface thereof at one end, said tube having a closure formation at said one end comprising inwardly directed end flaps and first and second side flaps, the side flaps of said closure formation being heat-sealed together from one end flap to the other and heat-sealed at least to one end flap of said closure formation, the heat-seal-inhibiting material being provided in a pattern such as to inhibit blocking of said closure formations where they are heat-sealed, the side flaps of said closure formation being heat-sealed together by a strip of heat-sealable material overlying the side flaps and sealed to the side flaps on lines of seal extending lengthwise of the strip.

4. A bag formed from a flat tube of heat-sealable sheet material, said tube having heat-seal-inhibiting material on the inside surface thereof at one end, said tube having a closure formation at said one end comprising inwardly directed end flaps and first and second side flaps, the side flaps of said closure formation being heat-sealed together from one end flap to the other and heat-sealed at least to one end flap of said closure formation, the heat-seal-inhibiting material being provided in a pattern such as to inhibit blocking of said closure formations where they are heat-sealed, the side flaps of said end closure formation being heat-sealed to both end flaps thereof, and said end closure formation having a mouth opening at the outer margin of one of its side flaps.

5. A bag formed from a flat tube of heat-sealable sheet material, said tube having heat-seal-inhibiting material on the inside surface thereof at one end, said tube having a closure formation at said one end comprising inwardly directed end flaps and first and second side flaps, the side flaps of said closure formation being heat-sealed together from one end flap to the other and heat-sealed at least to one end flap of said closure formation, the heat-seal-inhibiting material being provided in a pattern such as to inhibit blocking of said closure formations where they are heat-sealed, and a valve sleeve of flexible heat-sealable sheet material having an outer margin heat-sealed to the inner margin of the other end flap of said end closure formation, said sleeve having a central portion having a width corresponding to the width of said end closure formation and side portions underlying the side flaps of said end closure formation, said central portion of the sleeve having heat-seal-inhibiting material on the inside surface thereof.

6. A bag adapted when filled to have a rectangular top and bottom, said bag being formed from a flat tube of heat-sealable sheet material, said tube having heat-seal-inhibiting material on inside surfaces thereof at each end, said tube having closure formations at each end each comprising inwardly directed end flaps and first and second side flaps, the side flaps of each closure formation being heat-sealed together from one end flap to the other, the side flaps of one end closure formation being heat-sealed to both end flaps thereof, the side flaps of the other end closure formation being heat-sealed at least to both end flaps thereof, the heat-seal-inhibiting material being provided in a pattern such as to inhibit blocking of said closure formations where they are heat-sealed, one of said end closure formations having a mouth opening at the outer margin of one of its side flaps.

7. A bag adapted when filled to have a rectangular top and bottom, said bag being formed from a flat tube of heat-sealable sheet material, said tube having heat-seal-inhibiting material on inside surfaces thereof at each end, said tube having closure formations at each end each comprising inwardly directed end flaps and first and second side flaps, the side flaps of each closure formation being heat-sealed together from one end flap to the other, the side flaps of one end closure formation being heat-sealed to both end flaps thereof, the side flaps of the other end closure formation being heat-sealed at least to one end flap thereof, the heat-seal-inhibiting material being provided in a pattern such as to inhibit blocking of said closure formations where they are heat-sealed, and a valve sleeve of flexible heat-sealable sheet material having an outer margin heat-sealed to the inner margin of the other end flap of said other end closure formation, said sleeve having a central portion having a width corresponding to the width of said other end closure formation and side portions underlying the side flaps of said other end closure formation, said central portion of the sleeve having heat-seal-inhibiting material on the inside surface thereof.

8. A bag adapted when filled to have a rectangular top and bottom, said bag being formed from a flat tube of heat-sealable sheet material, said tube having heat-seal-inhibiting material on inside surfaces thereof at each end, said tube having closure formations at each end each comprising inwardly directed end flaps and first and second side flaps, the side flaps of each closure formation being generally of equal width and heat-sealed together from one end flap to the other, the side flaps of one end closure formation being heat-sealed to both end flaps thereof, the side flaps of the other end closure formation being heat-sealed at least to one end flap thereof, the heat-seal-inhibiting material being provided in a pattern such as to inhibit blocking of said closure formations where they are heat-sealed.

9. The method of making a plastic bag from a flat tube of heat-sealable sheet plastic material comprising preparing the tube with heat-seal-inhibiting material on the inside surface thereof at one end, forming a closure at said end of the tube by folding back an end portion of one wall of the tube on a fold line extending transversely across the tube to form inwardly directed end flaps, folding over a segment of said end portion on a transverse fold line to provide a first side flap, folding over a segment of the other wall of the tube on a transverse fold line to provide a second side flap generally equal in width to the first side flap, and heat-sealing said side flaps together and to at least one of said end flaps within the confines of said heat-seal-inhibiting material.

10. The method of making a plastic bag from a flat tube of heat-sealable sheet plastic material comprising preparing the tube with heat-seal-inhibiting material on the inside surfaces thereof at one end, forming a closure at said one end of the tube by folding back an end portion of one wall of the tube on a fold line extending transversely across the tube to form inwardly directed end flaps, folding over a segment of said end portion on a transverse fold line to provide a first side flap, folding over a segment of the other wall of the tube on a transverse fold line to provide a second side flap, heat-sealing said side flaps together and to said end flaps within the confines of said heat-seal-inhibiting material, and providing said closure with a mouth by forming an opening along one of the side flap fold lines of said closure.

11. The method of claim 10 wherein the side flaps are heat-sealed together by applying a separate strip of heat-sealable material over the side flaps and sealing the strip to the side flaps.

12. The method of making a plastic valve bag adapted when filled to have a rectangular bottom and a rectangular top from a flat tube of heat-sealable sheet plastic material comprising preparing the tube with heat-seal-inhibiting material on inside surfaces thereof at top and bottom, forming a closure at one end of the tube by folding back an end portion of one wall of the tube on a fold line extending transversely across the tube to form inwardly directed end flaps, preparing a valve sleeve blank with heat-seal-inhibiting material on part of one surface thereof, applying the blank to overlap the inner end margin of one of said end flaps with said surface of the blank on the outside and heat-sealing it thereto, folding over a segment of said end portion on a transverse fold line to provide a first side flap, folding over a segment of the other wall of the tube on a transverse fold line to provide a second side flap, side portions of the sleeve blank being concomitantly folded to form the bank into a sleeve, and heat-sealing said side flaps together and to the other end flap only within the confines of said heat-seal-inhibiting material, and forming a second closure at the other end of the tube by folding back an end portion of one wall of the tube on a fold line extending transversely across the tube to form inwardly directed end flaps, folding over a segment of this end portion to provide a first side flap for the second closure, folding over a segment of the other wall of the tube to provide a second side flap for the second closure, and heat-sealing said side flaps of the second closure together and to both end flaps of the second closure within the confines of said heat-seal-inhibiting material 13. A bag formed from a flat tube of heat-sealable sheet material, said tube having heat-seal-inhibiting material on the inside surface thereof at one end, said tube having a closure formation at said one end comprising inwardly directed end flaps and first and second side flaps, the side flaps of said closure formation being generally of equal width and heat-sealed together from one end flap to the other and heat-sealed at least to one end flap of said closure formation, the heat-seal-inhibiting material being provided in a pattern such as to inhibit blocking of said closure formation where said side flaps are heat-sealed to said one end flap.

14. A bag as set forth in claim 13 wherein the side flaps of said closure formation have lapping inner margins and are heat-sealed together along said margins.

15. A bag adapted when filled to have a rectangular top and bottom, said bag being formed from a flat tube of heat-sealable sheet material, said tube having heat-seal-inhibiting material on inside surfaces thereof at each end, said tube having closure formations at each end each comprising inwardly directed end flaps and first and second side flaps, the side flaps of each closure formation being generally of equal width and heat-sealed together from one end flap to the other, the side flaps of one end closure formation being heat-sealed to both end flaps thereof, the side flaps of the other end closure formation being heat-sealed at least to one end flap thereof, the heat-seal-inhibiting material being provided in a pattern such as to inhibit blocking of said closure formations where the side flaps thereof are heat-sealed to the end flaps.

16. The method of making a plastic bag from a flat tube of heat-sealable sheet plastic material comprising preparing the tube with heat-seal-inhibiting material on the inside surface thereof at one end, forming a closure at said end of the tube by folding back an end portion of one wall of the tube on a fold line extending transversely across the tube to form inwardly directed end flaps, folding over a segment of said end portion on a transverse fold line to provide a first side flap, folding over a segment of the other wall of the tube on a transverse fold line to provide a second side flap generally equal in width to the first side flap, heat-sealing said side flaps together, and heat-sealing said side flaps to at least one of said end flaps within the confines of said heat-seal-inhibiting material.

17. A bag formed from a flat tube of heat-sealable sheet material, said tube having heat-seal-inhibiting material on the inside surface thereof at one end, said tube having a closure formation at said one end comprising inwardly directed end flaps and first and second side flaps, the side flaps of said closure formation being heat-sealed together from one end flap to the other and heat-sealed at least to one end flap of said closure formation, the heat-seal-inhibiting material being provided in a pattern such as to inhibit blocking of said closure formations where said side flaps are heat-sealed to said one end flap, and a valve sleeve of flexible heat-sealable sheet material having an outer margin heat-sealed to the inner margin of the other end flap of said end closure formation, said sleeve having a central portion having a width corresponding to the width of said end closure formation and side portions underlying the side flaps of said end closure formation, said central portion of the sleeve having heat-seal-inhibiting material on the inside surface thereof.

18. A bag adapted when filled to have a rectangular top and bottom, said bag being formed from a flat tube of heat-sealable sheet material, said tube having heat-seal-inhibiting material on inside surfaces thereof at each end, said tube having closure formations at each end each comprising inwardly directed end flaps and first and second side flaps, the side flaps of each closure formation being heat-sealed together from one end flap to the other, the side flaps of one end closure formation being heat-sealed to both end flaps thereof, the side flaps of the other end closure formation being heat-sealed at least to one end flap thereof, the heat-seal-inhibiting material being provided in a pattern such as to inhibit blocking of said closure formations where the side flaps thereof are heat-sealed to the end flaps, and a valve sleeve of flexible heat-sealable sheet material having an outer margin heat-sealed to the inner margin of the other end flap of said other end closure formation, said sleeve having a central portion having a width corresponding to the width of said other end closure formation and side portions underlying the side flaps of said other end closure formation, said central portion of the sleeve having heat-seal-inhibiting material on the inside surface thereof.

References Cited

UNITED STATES PATENTS 3,263,902   8/1966   Ludlow et al. _____ 229—60

DAVID M. BOCKENEK, *Primary Examiner.*

UNITED STATES PATENT OFFICE
CERTIFICATE OF CORRECTION

Patent No. 3,403,841 October 1, 1968

Donovan D. Wendt et al.

It is certified that error appears in the above identified patent and that said Letters Patent are hereby corrected as shown below:

In the heading to the printed specification, lines 4 and 5 "Bemis Bro. Bag Company," should read -- Bemis Company, Inc., - Column 5, line 62, "heat-healed" should read -- heat-sealed --.

Signed and sealed this 24th day of February 1970.

(SEAL)
Attest:

Edward M. Fletcher, Jr.

Attesting Officer

WILLIAM E. SCHUYLER, JR

Commissioner of Patents